INVENTOR.
ALFONS PETERS
BY
AGENT

# United States Patent Office 2,699,843
Patented Jan. 18, 1955

2,699,843

MEANS FOR REMOVING EXCESS LUBRICANT FROM A RECIPROCATING MEMBER

Alfons Peters, Eindhoven, Netherlands, assignor to Hartford National Bank and Trust Company, Hartford, Conn., as trustee Application October 26, 1949, Serial No. 123,632

Claims priority, application Netherlands October 30, 1948

2 Claims. (Cl. 184—24)

This invention relates to a device for carrying off lubricant removed by a scraping member formed on a body, from the surface of a relatively reciprocating body.

It is possible for the lubricant to be moved along a reciprocating body from the point at which it is supplied to other parts of the body. In this way, the reciprocating body may become covered with a film of the lubricant. A reciprocating body usually runs in guides from which it may project at each stroke. The edge of the guide can be adapted to scrape off the lubricant film at least in part. The lubricant thus removed naturally accumulates in this area.

If this area is within the work space of a machine, for example a compressor, a hot-gas reciprocating engine, a refrigerating machine, an internal combustion engine or a steam engine, it is possible for the lubricant to be carried with the working medium into this work space and it may be deposited at undesired points in these engines, for example on heat exchangers. The latter may, for example, be condensers, coolers, heaters or regenerators in which case the heat transfer properties of these heat exchangers are adversely affected by the deposit of lubricant and the efficiency of the engine in question is reduced. Alternatively, the lubricant may cause carbon deposits, for example in an internal combustion engine, by which the operation of the engine is adversely affected. When the machine in question is a pump, there is a risk that the fluid in the pump may be impaired by the lubricant. In addition, considerable lubricant is lost.

The present invention has for its object to carry off lubricant scraped from a reciprocating body as aforesaid, thus avoiding the accumulation of lubricant referred to. According to the invention a device for carrying off lubricant removed by a scraping member formed on a body from a reciprocating member is characterized in that the space in front of the scraping member bounded by the surface to be scraped, connects with a channel system leading behind the scraping member at the surface of the scraped body and connected at its other end solely to the space formed by the clearance between the two bodies.

The scraping member will normally include a scraping edge which carries out its scraping action during one stroke of the relatively reciprocating motion. The scraped lubricant is carried away through the channel system passing behind the scraping member and is returned to the surface of the relatively moving body.

The device according to the invention may be used when either or both of the two bodies perform a reciprocating movement.

In one embodiment of the invention, the thickness of the layer of lubricant is also reduced in the proximity of the area at which the scraped lubricant is again supplied to the surface of the reciprocating body. This is effected by a second scraping operation when the moving body moves in the opposite direction to that in which the first scraping action occurs. Thus it is ensured that the layer of lubricant covering the moving body is comparatively thin so that, when the moving body covered with this lubricant layer is in a work space, the lubricant cannot be blown from the body.

Sometimes it is advantageous for the reciprocating body to be carried in guides at more than one point. Accordingly, a guide for the reciprocating body may be provided behind the scraping member, this obtaining a compact construction and a satisfactory guiding action.

The thickness of the layer of lubricant can be reduced in many different ways. However, it is advantageous if the member reducing the thickness of the layer of lubricant also performs a scraping action. This scraping may occur either throughout the periphery of the relatively moving body or over part of this periphery.

In order that no lubricant is left in front of the scraping member, this member may consist of a scraping edge forming a portion of a surface which makes an acute angle with the direction of motion of the reciprocating body relatively to the scraping edge.

A further embodiment of the invention may be used with advantage when the reciprocating body is substantially cylindrical or prismatic. Examples are a cylinder having a piston-rod guided by a bushing in the cylinder end-plate, a valve spindle and its associated bushing-shaped member or a piston and its associated cylinder.

In order to prevent the lubricant from being blown from the space in front of the scraping member before being allowed to flow away, the space in a cylinder having a piston-rod, which space is also bounded by the surface to be scraped, is recessed with respect to the inner wall of the cylinder in front of the scraping member, the said space being separated from the cylinder space by a wall and the rod moving back and forth through a wide bore provided in this wall.

The present invention may also be used for bodies of very different cross-sectional shape, for example the shoe of a cross-head and its associated guide path, the shape of cross-profile of the surfaces of shoe and guide path facing each other being, for example, flat or slightly curved.

In order that the invention may be readily carried into effect, two examples will now be described in detail with reference to the accompanying drawings.

In the embodiment shown in Fig. 1, the member reducing the thickness of the layer of lubricant consists of a scraping edge which extends round the periphery of a piston rod, while in the arrangement of Fig. 2 the scraping occurs only locally over part of the periphery.

Figure 1:
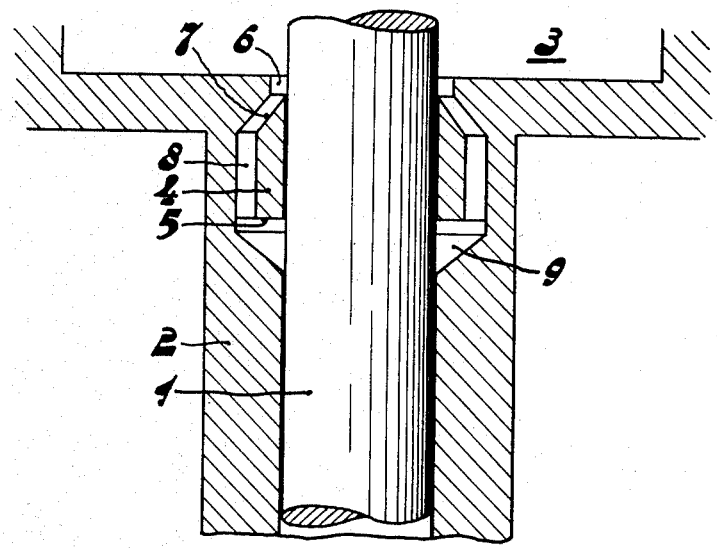
Fig. 1 is a sectional view of one embodiment of the invention.

In Fig. 1, a piston rod 1 moves back and forth through a bushing having cylindrical parts 2, 4. This piston rod is moved back and forth by a crank shaft mechanism (not shown) at the lower end of the rod, the upper end carrying a piston (not shown) which moves back and forth in the workspace 3.

The cylindrical portion 4 has a trapezoidal cross-section, the surface 5 of which provides a rectilinear scraping edge during the forward stroke. As a result, a quantity of lubricant is scraped from the piston rod so that on entering the work space 3 the piston rod carries a comparatively thin layer of lubricant. During the backward stroke, the removal of lubricant by the bore 6 of the cylinder end-plate is prevented by making this bore of much larger diameter than the piston rod 1.

The cylindrical part 4 has another rectilinear scraping edge 7 adapted to scrape off lubricant during the backward stroke this lubricant flowing through the channel system 8 to the space 9 adjacent the scraping edge 5. This space connects, except through the channel system 8 to the work space 3, solely with the space between the piston rod 1 and the cylindrical parts 2 and 4. It is now found that a state of equilibrium is established with the result that the level of lubricant remains substantially constant in the space 9. In consequence, the average consumption of lubricant is very small.

Figure 2:
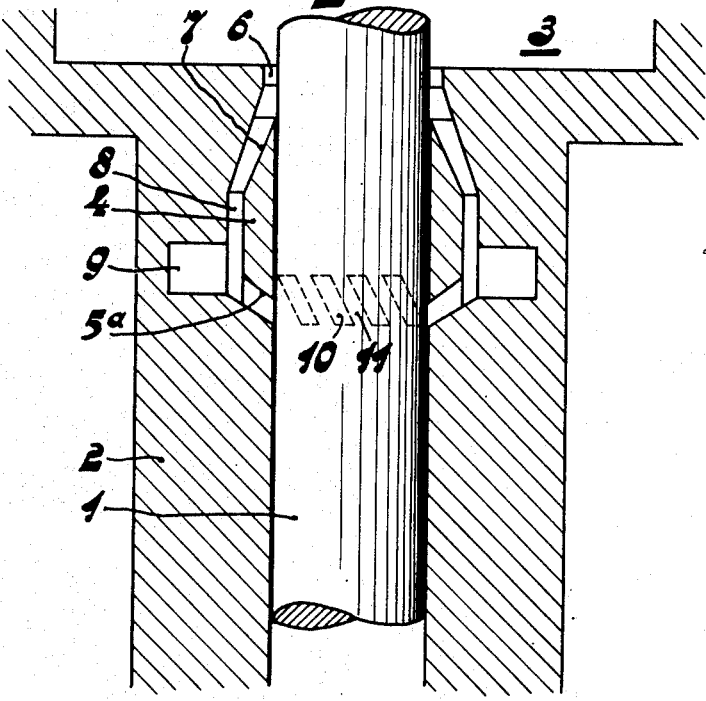
Fig. 2 is a view similar to Fig. 1 and shows a second embodiment of the invention.

In Fig. 2, corresponding parts bear the same reference numerals as in Fig. 1. In Fig. 2, the rectilinear scraping edge 5a performs its action locally only over part of the periphery of the rod. As shown in this figure, the space 9 connects, through the helical or inclined apertures 10, with the space between the piston rod 1 and the bushing, the helical apertures being separated from one another by helical lands 11. The device shown in this figure operates in the same manner as the device shown in Fig. 1.

Many changes may be made in the constructions shown in the drawing without departing from the scope of the invention. Thus, for example, the scraping edge 7 may at least partly be within the work space 3. Alternatively, a plurality of scraping edges or combinations of scraping edges may be placed one behind the other.

In the drawings, the constructions are vertical, but the device according to the invention is adapted to operate also in an inclined position. In this event, however, the lubricant scraped off by the scraping edge 7 should flow as rapidly as possible to the space 9.

In the foregoing, the body is said to be given an exactly rectilinear reciprocating motion. However, the term is intended to include a relatively reciprocating movement which is not exactly rectilinear, since it is also possible to superimpose on the rectilinear motion a different motion e. g. a rotary or a zig-zag motion, for example with pistons which are moved back and forth by a wobble-disc or swash-plate mechanism. Moreover, the reciprocating motion may not follow a straight line but a curved line, for example a rocking movement.

What I claim is:

1. Scraping apparatus for removing excessive lubricant from surfaces comprising two relatively movable members having interfitting surfaces, one of said members being provided with a plurality of scraping portions including at least two scraping edges surrounding the surfaces to be scraped on the other said member, both of said edges being rectilinear and positioned at an angle of less than 90° with the direction of movement of the other member, a channel system interconnecting said scraping portions, and a space serving as a lubricant reservoir connected to said channel system adjacent to one of said scraping edges.

2. Scraping apparatus for removing excessive lubricant from surfaces comprising two relatively movable members having interfitting surfaces, one of said members being provided with a plurality of scraping portions including at least two scraping edges surrounding the surfaces to be scraped on the other said member, both of said edges being rectilinear but at different angles to the direction of movement of the other member, said scraping portions being so formed as to provide channel connected spaces surrounding the surface of the other said member at the ends of said scraping portions, and a space serving as a lubricant reservoir communicating with said channel connected spaces.

References Cited in the file of this patent

UNITED STATES PATENTS

| | | |
|---|---|---|
| 1,552,547 | Disch | Sept. 8, 1925 |
| 2,155,005 | Brooks | Apr. 18, 1939 |
| 2,423,181 | Emery | July 1, 1947 |
| 2,467,510 | Burg | Apr. 19, 1949 |